Figure 1:
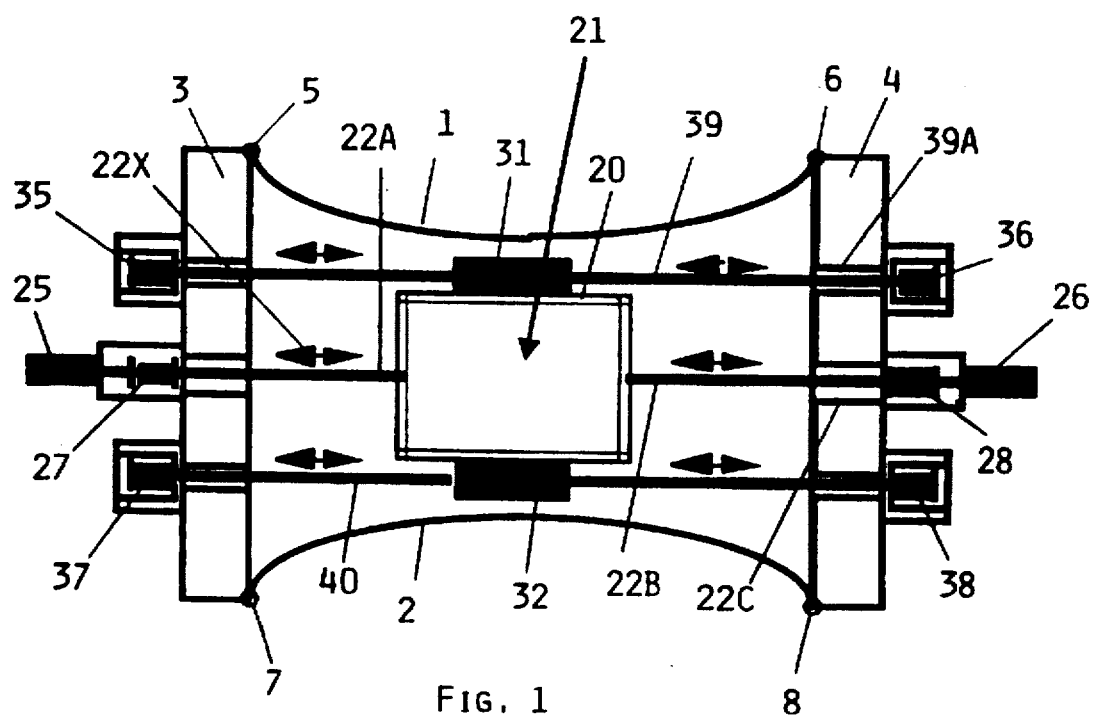

United States Patent [19]
Tenghamn et al.

[11] Patent Number: 5,757,726
[45] Date of Patent: May 26, 1998

[54] FLEXTENSIONAL ACOUSTIC SOURCE FOR OFFSHORE SEISMIC EXPLORATION

[75] Inventors: Rune Tenghamn; Gunnar Molund; Magnus Zetterlund, all of Västerås, Sweden

[73] Assignee: Petroleum Geo-Services ASA-Norway, Lysaker, Norway

[21] Appl. No.: 750,162

[22] PCT Filed: May 5, 1995

[86] PCT No.: PCT/NO95/00072

§ 371 Date: Nov. 1, 1996

§ 102(e) Date: Nov. 1, 1996

[87] PCT Pub. No.: WO95/30912

PCT Pub. Date: Nov. 16, 1995

[30] Foreign Application Priority Data

May 6, 1994 [NO] Norway .................. 94.1707

[51] Int. Cl.$^6$ ............................................. H04R 17/00
[52] U.S. Cl. .................. 367/152; 367/163; 367/174; 181/110; 310/337
[58] Field of Search ................................. 367/163, 174, 367/152; 181/110; 310/337

[56] References Cited

U.S. PATENT DOCUMENTS

| | | | |
|---|---|---|---|
| 3,258,738 | 6/1966 | Merchant | 367/163 |
| 4,014,403 | 3/1977 | Mifsud | 181/114 |
| 4,483,411 | 11/1984 | Mifsud | 181/120 |
| 4,557,348 | 12/1985 | Mifsud | 181/120 |
| 4,578,784 | 3/1986 | Mifsud | 367/143 |
| 4,633,970 | 1/1987 | Mifsud | 181/120 |
| 4,764,907 | 8/1988 | Dahlstrom et al. | 367/163 |
| 4,862,429 | 8/1989 | Rolt | 367/165 |
| 4,864,548 | 9/1989 | Butler | 367/155 |
| 4,922,470 | 5/1990 | McMahon et al. | 367/163 |
| 4,932,008 | 6/1990 | Rolt | 367/165 |
| 4,964,106 | 10/1990 | Bromfield | 367/165 |
| 5,016,228 | 5/1991 | Arnold et al. | 367/163 |
| 5,136,556 | 8/1992 | Obara | 367/163 |
| 5,291,461 | 3/1994 | Boeglin et al. | 367/163 |
| 5,363,346 | 11/1994 | Malteby | 367/163 |

*Primary Examiner*—J. Woodrow Eldred
*Attorney, Agent, or Firm*—Gordon T. Arnold

[57] ABSTRACT

Flextensional acoustic source with sound-emitting surfaces (1, 2, 3, 4) adapted to be excited into vibrational movement, and for use in seismic exploration at sea. The source comprises a drive unit (21) being through the intermediary of at least one push element (22A, 22B) adapted to impose vibrational movement to the sound-emitting surfaces. Between at least one push element (22A, 22B) and the associated sound-emitting surface(s) (1, 2, 3, 4) there is provided a non-linear spring element (27, 28) the spring constant of which is controllable. Two oppositely acting push elements (22A, 22B) are arranged in axial alignment and preferably centrally in the source, and in addition thereto there are provided at least two tension elements (39, 40) with associated controllable, non-linear spring elements (35, 36, 37, 38) and being coupled to the sound-emitting surfaces (1, 2, 3, 4).

28 Claims, 3 Drawing Sheets

FLEXTENSIONAL ACOUSTIC SOURCE FOR OFFSHORE SEISMIC EXPLORATION

This invention relates in general to flextensional acoustic sources for emitting sound waves in water, in particular low-frequency sound waves for use in offshore seismic exploration. Such sources, being employed for generation of sound waves in water, are referred to under various terms, such as seismic transmitters, flextensional transmitters or acoustic pingers, cf. also Sonar.

The acoustic source according to the invention can with advantage find uses in connection in such sound or tone transmitters, whereby the soundwaves emitted into the water can be reflected from the sea bottom and underlying geological formations, with subsequent listening or detection by means of hydrophones or geophones of various types.

The invention is particularly directed to a special spring arrangement for the purpose of being able to influence the oscillating system in such an acoustic source, i.e. the resonance relationships therein and an improved impedance matching when generating low-frequency sound waves in water.

It is well known that low-frequency sound waves can propagate over longer distances through water and geological structures, than what is the case with high frequency sound waves. For military uses and in offshore oil and gas industry there has for a long time been a need for powerful, low-frequency sound sources which can operate under water. Transmitters of various designs and embodiments for these purposes and uses have been available for a long time. Such acoustic sources are described for example in Seismic Energy Sources 1968 Handbook, Bendix, United Geophysical Corporation USA 1968, and in Transducer Needs for Low-frequency Sonar, Proceedings of the Second International Workshop on Power Transducers for Sonic and Ultrasonics, France, June 1990.

Most of the acoustic sources being presently in use, are of the impulse type, where it is intended that the transmitter or source shall emit as much energy as possible during the shortest possible time. The frequency content of such an acoustic source can be changed only to a small degree, and different types of sources are selected for the various surveying tasks.

In recent time there have been developed seismic energy sources in the form of vibrators being able to vibrate within different frequency bands, i.e. with frequency sweep. To this group belong vibrators operating with hydraulic drive medium and sources utilizing the piezo-electric effect or the magnetostrictive effect. The hydraulic vibrators control a piston through the intermediary of valve means, and thereby can provide large vibration amplitudes. As known, the piezo-electric effect involves a length variation of a crystaline material when an electric voltage is applied to its end fases, and conversely there will be generated an electric voltage when the material is subjected to a physical deformation. Magnetostriction means that a magnetic material being subjected to a change of magnetic flux, will undergo a change of length, and conversely an externally applied length variation will result in a change of the magnetic flux.

There are a variety of designs of acoustic sources. In low-frequency uses it is common that they have a circular surface in the form of a piston in case of hydraulic operation, or a cylindrical shape with either a circular or an elliptic cross section when based upon piezo-electric or magnetostrictive material. A hydraulic concept related to piston sources is described in The Marine Vibrator source, First Break Vol. 6, No. 9, September 1988, pp 285–294.

A big problem with this type of source is that the efficiency is low when the source operates outside its resonance frequency. Moreover the signal will be phase shifted and distorted depending on the location of the resonance frequency in relation to the applied or driving frequency. This will also restrict the ability to control a well-defined signal from the source. By bringing the source to operate close to its resonance frequency within a broad frequency range, the amplitude will normally be higher than when resonance is not present. The recognition of these relationships is very significant in connection with the present invention.

The use of vibrators in the seismic field and based upon hydraulics can give large amplitudes at low frequencies. In the case of piston transmitters the piston movement is controlled by means of a valve device. The possibility of controlling such hydraulic piston transmitters with respect to amplitude combined with frequency, is limited however.

The advent of the so-called high-magnetostrictive magnetic materials has provided better conditions for manufacturing good acoustic sources or transmitters. With such materials in the drive element it is possible to obtain amplitude changes which in general can be up to 20 times more than obtained by piezo-electric materials. Transmitters taking advantage of these high-magnetostrictive materials have been on the marketplace for several years. However the improved amplitude is still relatively low, which implies that these sources are dependent on their resonance frequency.

At this point there is reason to refer to the theory of mechanic, oscillating systems, comprising an oscillating mass, a spring constant and damping. In the uses of interest here, the damping of such an oscillating system to a large extent will consist in the sound energy being radiated. The oscillating mass will also be influenced by surrounding water. The total spring constant in such a system can be influenced by various components incorporated in the structure. If the total spring constant is denoted k and the oscillating mass m, the resonance frequency ω as known will be determined by the following relationship:

$$\omega = \sqrt{\frac{k}{m}}$$

i.e. that the resonance frequency is determined by the ratio between spring constant and oscillating mass.

U.S. Pat. Nos. 4,014,403, 4,183,411 and 4,578,784 relate to seismic sources of the piston type and with means for varying the spring constant or stiffness during sweeping of the frequency. The first mentioned U.S. Patent is intended for land seismics and the two latter patents are based on hydraulic driving power.

Thus on the above background the invention is directed to flextensional acoustic sources for offshore seismic exploration, having sound-emitting surfaces adapted to be excited to vibrational movement, and comprising preferably electrically control drive unit which through the intermediary of at least one push element is adapted to set up vibrational movement in the sound-emitting surfaces, and a non-linear spring element having controllable spring constant is provided between at least one push element and the associated sound-emitting surface(s).

When the drive unit is based on the piezo-electric or magnetostrictive effect as mentioned above, it can be more or less integrated in the associated push element. In certain designs from the recent time, being of particular interest in the present context, the sound-emitting surfaces are formed by membrane-like plate members, so that there is here the question of a form of flextensional transmitters, whereby the resonance and impedance relationships when operating such sources in water, with advantage can be controlled or regulated on the basis of the principles according to the present invention.

Since the resonance in the oscillating mechanical systems being of particular interest here, is determined by the ratio between the spring constant, which is mainly related to the push elements and membrane or plate members mentioned, and the total oscillating mass, it is possible to change the resonance frequency more or less optionally by varying the spring constant in spring devices incorporated in the system. An important feature in this connection is that these spring devices comprise controllable, non-linear springs or spring elements.

What is novel and specific in the acoustic source according to the invention in the first place consist therein that two oppositely acting push elements with associated controllable spring elements are axially aligned with respect to each other and preferably centrally in relation to the sound-emitting surfaces, and that at least two tension elements with associated controllable non-linear spring elements are provided in addition to the push elements and are coupled to the sound-emitting surfaces through respective associated spring elements.

The fundamental solution presented here for designing an acoustic source involves a high degree of freedom concerning the structure, dimensions and acoustic power, so that in flextensional sources the stiffness in the tension and push elements may be adjusted according to the stiffness in the membrane or plate members.

The impedance adjustment referred to here is above all interesting in connection with a drive unit which acts on the membrane members by means of compressive force only. Moreover the present solution when compared with the U.S. Patent specifications discussed above, involves advantages in that the spring constant of the spring elements in connection with the push elements can be adjusted separately and likewise the spring constant of the spring elements being coupled to the tension elements, can be regulated separately. This gives a high degree of freedom for adjustment of the source and has substantial significance when a flextentional transmitter of the shell type is concerned, which also has its own spring constant. In order to obtain a signal free of distortion, i.e. a signal having small proportions of harmonics, the springs should be adjusted so that the following condition is satisfied:

Spring constant-shell+spring constant-tension element= spring constant-push element.

For acoustic sources having their own spring constant of significance, this means that one must be able to adjust the elements according to the above in order to obtain the desired control of the output.

Figure 2:
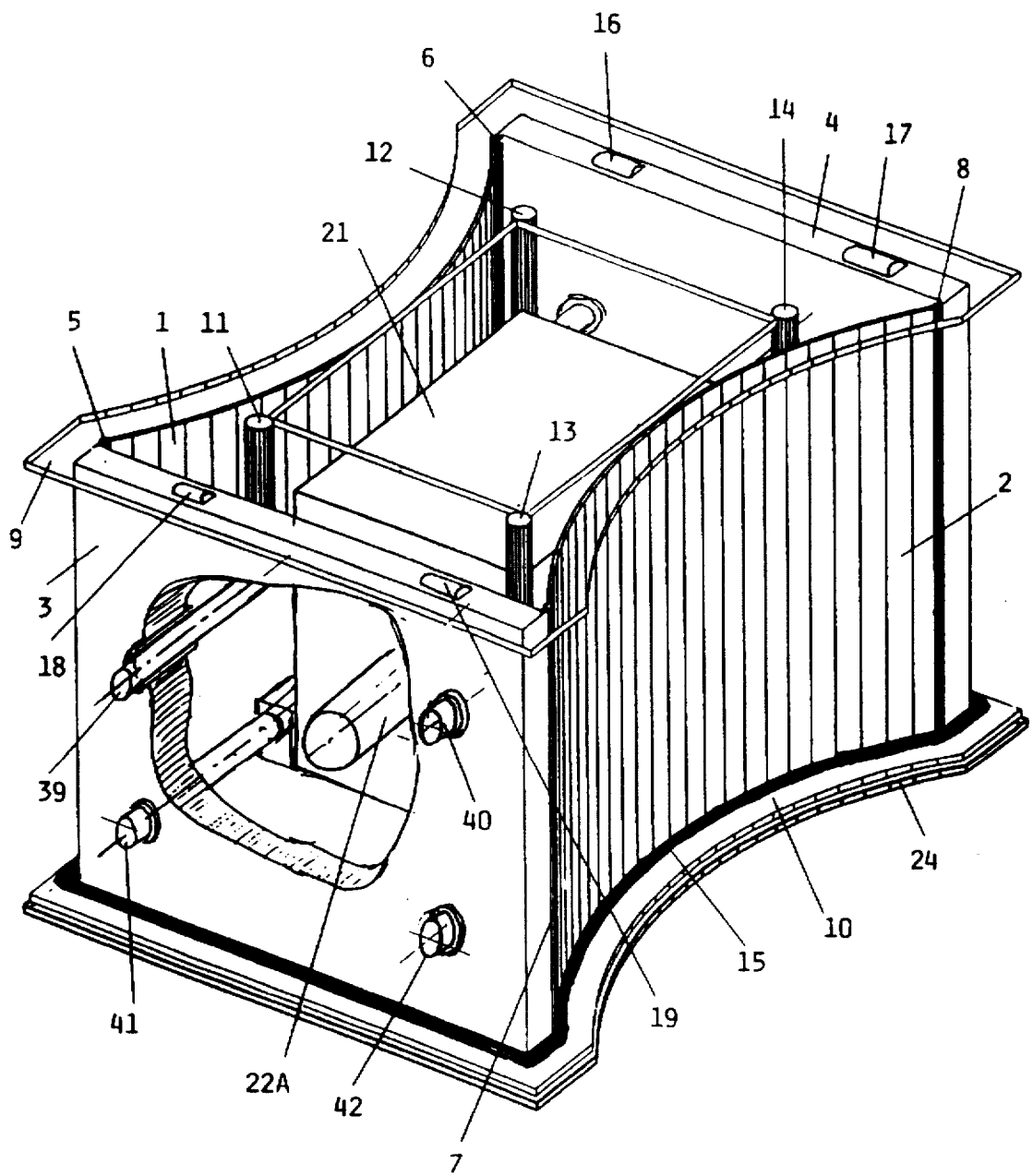
Figure 3:
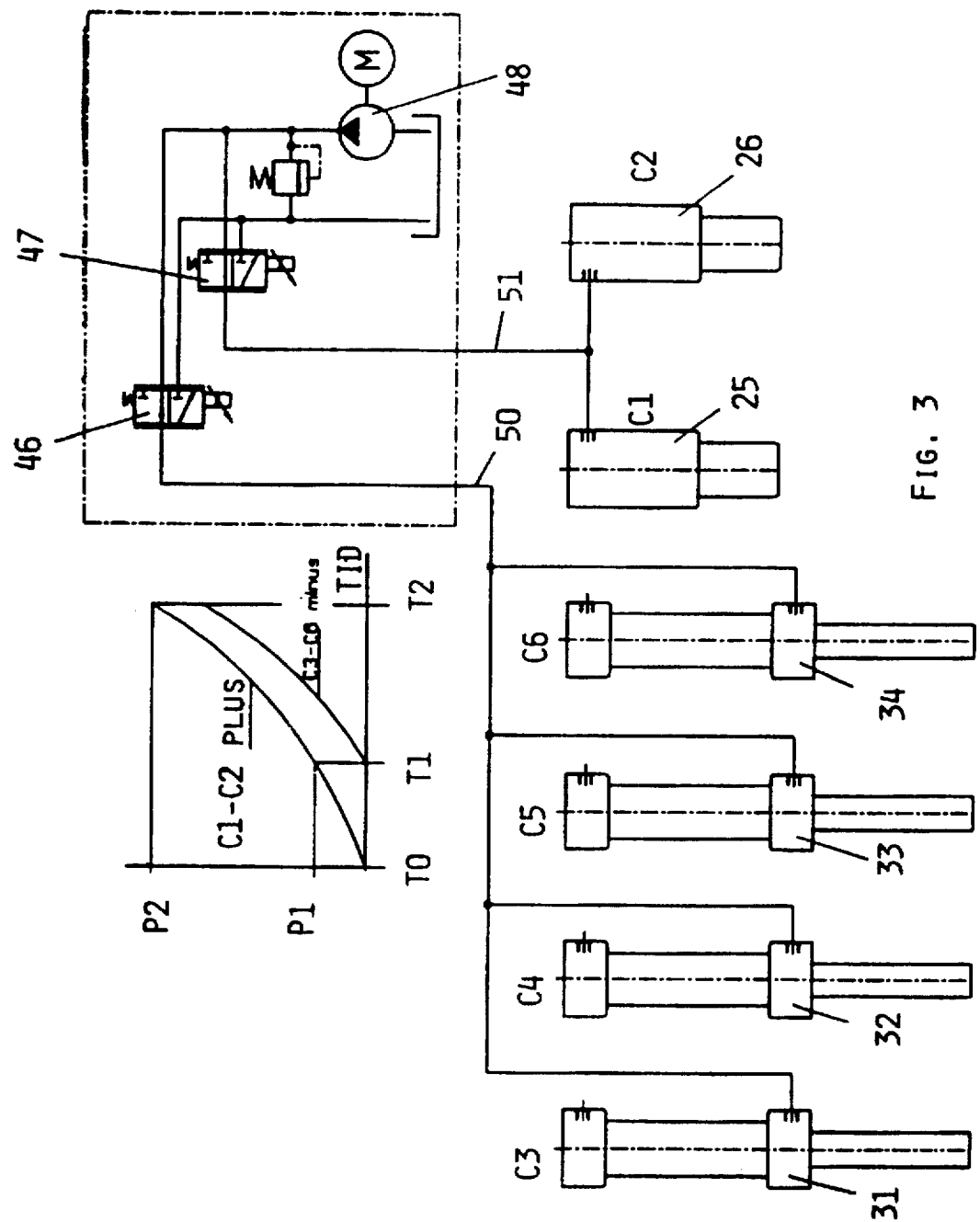

The invention as well as additional features and advantages thereof shall be described more closely in the following description with reference to the drawings, where:

FIG. 1 highly schematically and simplified shows a longitudinal section through an embodiment of the acoustic source according to the invention, FIG. 2 in perspective view and in part somewhat more detailed shows important main components included in the acoustic source of FIG. 1, and FIG. 3 shows an example of a hydraulic control system in association with the acoustic source as for example illustrated in FIGS. 1 and 2.

In the exemplary embodiment shown here the main shape of the flextensional acoustic source or transmitter is given by the assembly and cooperation of several plate-shaped parts. In the first place there is here the question of primary sound-emitting surfaces or shell surfaces in the form of two elastic, membrane-like plate members 1 and 2, having both a concave curvature, so that they may be considered to be arranged back to back in the acoustic source. Moreover the structure comprises two end plates or end pieces 3, 4, which by means of four hinge connections 5, 6, 7 and 8 are connected to respective end portions of the pair of plate members 1 and 2.

The plate members or membranes 1 and 2 have a rectangular or possibly square shape, i.e. with width and height dimensions of comperable order of magnitude. The curvature of the membrane plates 1 and 2 lies in one plane, and it is preferred that the curvature substantionally follows a hyperbola.

As an alternative to the hinge connections 5, 6, 7 and 8 shown, the end pieces 3 and 4 can be connected to the plate members 1 and 2 in other ways, for example by means of an elastic piece of material which in itself provides for the desired flexibility, or even by designing the end pieces and the plate members as integral parts, where elastic deformation in the junction or end portions is adapted to make possible the vibrational movements which occur during operation of the acoustic source or transmitter.

On either side of the membrane plates 1, 2 and the end pieces 3, 4 there are mounted two inner side plates 9 and 10, the spacing of which is adapted to the width of the membrane plates and the end pieces, and is determined by a number of distance elements in the form of distance rods 11, 12, 13 and 14, the ends of which are secured to the pair of side plates 9 and 10. For a better illustration of other parts of the structure, the side plate 9 in FIG. 2 is shown as if it were transparent. At side edges of the two end pieces there are provided supporting rollers or wheels 16, 17, 18, 19 (see FIG. 2) adapted to run against the inner surface of the inner side plates 9 and 10.

At 15 in FIG. 2 there is illustrated a sealing element, for example in the form of a rubber profile, so as to obtain a sealed connection between the side plate 10 concerned and the adjacent side edges of the end pieces 3, 4 and the membrane plates 1 and 2 respectively.

Rubber seals 15 (being present at both side plates 9 and 10) are flexible in order to allow both end pieces 3, 4 and the membrane plates 1, 2 to move in the plane of the inner side plates during operation of the source, i.e. with the vibrational movements being then generated.

Outside the inner side plates 9 and 10 and on either side there is mounted an additional outer side plate 24 (shown only at the inner side plate 10 in FIG. 2). These outer side plates serve, inter alia, for the mounting of external drive motors and the like, not being shown in the figures of drawings. By disassembling one or both of the outer side plates 24, access is obtained to the interior of the source structure in a favourable practical way, through suitable and possibly closeable openings in the inner side plates 9 and 10. Between the double side plates at each side there are provided sealing elements (not shown) which contribute to disassembly and removal of the outer side plates 24 in a simple manner, whereby this will have no influence on the rubber seals 15 referred to above.

A drive unit 21 with associated frame 20 constitutes central component in this acoustic source, whereby the drive unit through rod-shaped push elements 22A and 22B serves to set up vibrational movement in membrane plates 1 and 2 through the two end pieces 3 and 4. At this point it can be mentioned that even though the emission of sound mainly takes place from the membrane plates 1 and 2, the outer surfaces of the end pieces 3 and 4 will also to some degree contribute to sound emission during operation, since these surfaces apparently will also be subjected to vibrational movement.

It is an advantage to have the frame 20 for the drive unit mounted to at least some of the distance elements 11, 12, 13 and 14 shown, so that the drive unit 21 will be supported by these. Moreover the frame and the drive unit has no rigid connection to the end pieces 3, 4 or the membrane plates 1, 2. Thus the frame 20 with the drive unit 21 will "float" inside the source structure, i.e. the drive unit with its frame will not be subjected to any significant mechanical stress during operation. As will be described more closely below, the drive unit 21 with its frame 20 will have a mechanically biassed condition as a result of spring devices being incorporated in the structure.

As will be best seen from FIG. 1 the above mentioned push rods or elements 22A and 22B extend centrally and axially through the acoustic source, and this longitudinal axis can be regarded as coincident with the long axis of the hyperbola-shaped membrane plates 1 and 2, whereas the axis of the push elements 22A and 22B represents an axis of symmetry in the structure. Push elements 22A and 22B are excited to vibrational movements in this longitudinal direction by means of drive unit 21, which operates at a desired frequency for the acoustic source. As a drive unit 21 there can be employed devices of various types, for example known types based upon piezo-electric or magnetostrictive effect. A preferred form of drive unit, however, is the one which is the subject of Norwegian Patent Application No. 93.0916 (corresponds to WO 94/22036). The electric drive motor for the latter drive unit in such case advantageously can be located outside the box-like structure formed by the main components of the source in this embodiment, as illustrated most completely in FIG. 2.

The acoustic source of the type concerned here, comprises a particular and adjustable spring device, namely being in the first place associated with push elements 22A and 22B (see FIG. 2). In this example the push elements extend freely through openings in end pieces 3 and 4, as for example illustrated at the opening 22C for push element 22B in end piece 4. The two push elements act each on an associated end piece 3 and 4 through compression springs 27 and 28 respectively, the compression of which can be controlled by means of associated hydraulic cylinders 25 and 26. In this connection it is of significance that the spring elements 27 and 28 have a non-linear characteristic, so that the spring constant will be adjustable by means of the hydraulic cylinders 25 and 26.

In FIG. 1 there are also shown additional rod-shaped elements 39 and 40 between the two end pieces 3 and 4, and these elements 39 and 40 are tension elements. Thus they are subjected to tensional stress and thereby are included in a balanced system together with the plate members 1 and 2, which also take up axial forces in the assembled arrangement. Preferably there are provided more than two tension elements 39, 40, in actual practice four such elements may be suitable, all having corresponding design and function and are located symmetrically around the axis of push elements 22A and 22B. FIG. 2 partially shows the four tension elements 39, 40, 41 and 42. Tension elements 39 and 40 act on end pieces 3 and 4 through compression springs 35, 36 and 37, 38 respectively, as will be seen from FIG. 1. Furthermore the middle portion of each of the tension elements 39 and 40 have their hydraulic cylinder 31 and 32 respectively, which according to the figure of drawing are located at the side of drive unit 21 and frame 20, but is not connected thereto. As shown at 39A both tension elements 39 and 40 also pass freely through openings in end pieces 3 and 4. Arrows in both directions, as shown for example at 22X, serve to illustrate the movement and adjustment possibilities for all elements 22A, 22B, 39 and 40, being extended between end pieces 3 and 4, and comprising hydraulicaly controllable spring elements.

The above mentioned four tension elements 39–42 all have its own spring element at each end in connection with the respective end pieces 3 and 4, and for the purpose of a rational and practical design being able to utilize standard components, each push element 22A and 22B preferably has associated spring elements 27 and 28 being composed of four individual springs in parallel, whereby each of these individual springs can have in the principle the same structure and practical design as each spring element for the tension elements 39–42.

In short this controllable spring arrangement makes possible an adjustment of resonance or improved impedance matching when generating low-frequency sound waves in water. In this connection it is desireable to give the membrane or plate members 1 and 2 a mechanical bias, which is provided for by the spring devices described for push elements 22A and 22B. The hydraulic cylinders 25 and 26 makes it possible to obtain effective elongation or shortening of the push elements, so that the mechanical bias can be regulated. As an alternative to hydraulic cylinders in this structure, for example purely mechanical devices may be contemplated, such as screw devices. Also adjustment by means of an electric motor is a good alternative in this connection.

An advantageous form of controllable spring elements for practical uses, consists of spring packages composed of cup springs, where a number of cup springs in each package or each spring element can have a varying spring constant. The resulting spring constant of such spring element, according to the invention will be changed by means of a hydraulic cylinder, an electric motor or the like, which provides for compressing of a number of cup springs or disks, so that these have no longer any spring effect. Thus the resulting spring constant is determined by the remaining, non-compressed cup or spring disks. This function can be incorporated in all controllable spring elements 27, 28 and 35–38 in FIG. 1.

As a consequence of the position of the associated hydraulic cylinders 25, 26 and 31, 32, the forces exerted by these will have an opposite direction, so that only the spring constant of the source will be altered. In order that such a source shall operate within a wide frequency range, it is of much significance that the push elements 22A, 22B are rigid, so that the spring elements 27 and 28 acting effectively in series therewith, will be dominating. In other words the spring constant of the spring element is clearly smaller than the spring constant of the push element. In a corresponding manner it is more or less a necessary prerequisite that the membrane or plate members 1 and 2 have a smaller spring constant than the spring elements being connected in parallel to the plate members 1 and 2, so that also in this regard the parallel-connected spring elements will be dominating.

It will be recognized that the spring constant of the spring elements 27 and 28 belonging to the push elements, advantageously can be of the same order of magnitude as for the spring elements 35–38 for the tension elements.

FIG. 3 shows an example of a hydraulic regulating or control system for the above hydraulic cylinders 25 and 26 as well as 31 and 32, two additional cylinders 33 and 34 being shown in parallel to cylinders 31 and 32. Accordingly in addition to tension elements 39 and 40 as shown in FIG. 1, there can advantageously be provided further two tension elements 41 and 42 (see FIG. 2) being parallel thereto, and with a symmetrical arangement of all four tension elements about the common axis of push elements 22A and 22B, as already mentioned above.

Cylinders 31–34 are connected to a hydraulic circuit 50 and cylinders 25, 26 are connected into a hydraulic circuit 51. The pressure in these circuits is controlled separately by means of respective regulating valves 46 and 47. In the system there is incorporated a hydraulic pump 48. Apart form this the funcion of this hydraulic system does not seem to need any further explanation. By means of the system it is possible to maintain a constant bias in membrane or plate members 1 and 2, as will appear from the diagram 49 incorporated in FIG. 3. Frequency sweeping of the acoustic source is provided for by increasing the hydraulic pressure P as a function of time, for example with a sweep time interval (from A1 to A2) in 15–30 seconds, i.e. with simultaneous continuous regulation of the spring constants in the system.

It is obvious that the invention makes possible a variety of embodiments in relation to the examples being illustrated and described above. Such variants can have to do with the choice of spring type, implying for example that torsion springs, cylindrical torque springs, tension springs, buffer springs, cylindrical compression springs, conical compression springs, leaf springs and other types of springs can be contemplated in this connection. Also the regulation or bias system can be based upon different power from hydraulic power, for example electric operation, as already mentioned. The described arrangement of hydraulic regulation cylinders in "series" with the spring elements and push elements and tensions elements respectively, may be modified to a "parallel" arrangement of the cylinders with respect to the spring elements, so that only the spring elements are influenced by the cylinders, which thereby will have a "floating" position in the oscillating system. The drive unit can be based on an amplitude-generating axle driven by an electric motor, as for example described in Norwegian Patent Application No. 93.0916. It is however perfectly possible to employ drive units based upon hydraulic power, magnetostrictive or piezo-electric effect. Instead of the membrane-like plate members described, which are curved in one plane, the sound-emitting surfaces can essentially consist of an elliptic shell or possibly a circular shell shape, as previously described with respect to flextensional transmitters. As to the particular design of the flextensional source or transmitter with the membrane-like members 1 and 2 with associated end pieces 3 and 4 as well as side plates 9 and 10, as illustrated in FIG. 2, reference is made here finally to the co-pending Norwegian Patent Application No. 94.1708.

We claim:

1. Flextentional acoustic source for offshore seismic exploration, with sound-emitting surfaces (1, 2, 3, 4) adapted to be excited into vibrational movements, comprising an electrically controlled drive unit (21) which through an intermediary of at least one push element (22A, 22B) is adapted to set up vibrational movements in the sound-emitting surfaces, and where there is provided a non-linear spring element (27, 28), the spring constant of which is controllable (25, 26), between at least one push element (22A, 22B) and the associated sound-emitting surface(s) (1, 2, 3, 4), characterized in that two oppositely acting push elements (22A, 22B) with associated controllable spring elements (27, 28) are axially aligned with respect to each other and preferably centrally in relation to the sound-emitting surfaces (1, 2, 3, 4), and that at least two tension elements (39, 40) with associated controllable, non-linear spring elements (35, 36, 37, 38) are provided in addition to the push elements and with connection to the sound-emitting surfaces (1, 2, 3, 4) through associated spring elements (35, 36, 37, 38), respectively.

2. An acoustic source as in claim 1, characterized by the provision of hydraulic cylinders (25, 26, 31, 32) for controlling the spring constant of the non-linear spring elements (27, 28, 35, 36, 37, 38).

3. An acoustic source as in claim 1, characterized by the provision of at least one electric motor for controlling the spring constant of the non-linear spring elements.

4. An acoustic source as in claim 1, 2, or 3, characterized in that said tension elements (39, 40) are arranged in parallel to the push elements (22A, 22B).

5. An acoustic source as in claim 4, characterized in that at least two tension elements (39, 40, 41, 42) are positioned with a regular distribution about the axis of the push elements.

6. An acoustic source as in claim 5, characterized in that the spring constant of the spring elements (27, 28) for the push elements, and the spring elements (35, 36, 37, 38) of the tension elements have the same order of magnitude when compared to each other.

7. An acoustic source as in claim 1, characterized in that the spring elements are compression springs and that each spring element comprises at least two cup spring disks having different spring constants.

8. A frequency adjustable acoustic source with curved sound-emitting surfaces adapted to be excited into vibrational movement for use in offshore seismic exploration, the source comprising:

a drive member;

at least one push element having a first end and a second end, the first end of the push element being connected axially to the drive member and the second end of the push element being connected to at least one end member wherein movement of the drive member is transmitted through the at least one push element and the end member to the sound-emitting surfaces; and a non-rigid connection between the second end and the end member, the connection having an adjustable modulus.

9. An acoustic source as in claim 8, wherein the drive member comprises an electronically controlled drive unit.

10. An acoustic source as in claim 8, further comprising a modulus adjustment member.

11. An acoustic source as in claim 10, wherein said connection comprises a spring element.

12. An acoustic source as in claim 11, wherein said spring element comprises at least two cup spring disks.

13. An acoustic source as in claim 10, wherein said modulus adjustment member comprises an adjustable actuator having a first actuator member attached to a first end of the connection, and a second actuator member, positioned for reciprocation with the first actuator member, connected to the at least one sound-emitting surface.

14. An acoustic source as in claim 13, wherein said connection comprises a spring element.

15. An acoustic source as in claim 14, wherein said modulus adjustment member comprises an hydraulic cylinder.

16. An acoustic source as in claim 14, wherein said modulus adjustment member comprises a screw.

17. An acoustic source as in claim 8, further comprising a tension member connected between said end member and another end member, wherein said end members are flexibly connected to said curved sound-emitting surfaces.

18. An acoustic source as in claim 17, wherein said tension member is connected to both end members by a non-rigid connection having a modulus.

19. An acoustic source as in claim 18, further comprising a means for adjustment of the modulus of the non-rigid connection between said tension member and at least one of said end members.

20. An acoustic source as in claim 18, wherein the non-rigid connection comprises a spring element.

21. An acoustic source as in claim 20, further comprising a spring tension adjustment member.

22. An acoustic source as in claim 21, wherein said spring tension adjustment member is positioned intermediate the tension member, the spring tension adjustment member comprising an adjustable actuator having a first end and a second end, the first actuator end attached to a first end of the tension member, and the second actuator end attached to a second end of the tension member.

23. An acoustic source as in claim 22, wherein the adjustable actuator comprises an hydraulic cylinder.

24. An acoustic source as in claim 22, wherein the adjustable actuator is controlled by an electric motor.

25. A process for generating a marine seismic source signal with a source having a first, a second, and a third axis, including at least four moveable sound-emitting members positioned and arranged for movement along the first and second axes, and a drive member positioned and arranged for movement along the first axis, wherein the movement along the first axis is transmitted into movement of at least one moveable sound-emitting member positioned on the first axis and of at least one moveable sound-emitting surface positioned on the second axis, the process comprising:

moving a substantially rigid push element along the first axis with a drive unit;

moving, through a non-rigid connection having an adjustable modulus, the at least one moveable sound-emitting member positioned on the first axis in response to the movement of the substantially rigid push element along the first axis; and moving the at least one moveable sound-emitting member positioned on the second axis in response to the movement of the substantially rigid push element along the first axis.

26. A process as in claim 25, further comprising transmitting movement along the first axis to the at least four sound-emitting members through at least one non-rigid connection between a substantially rigid push element and at least on sound-emitting surface.

27. A device for generating a marine seismic source signal with a source having a first, a second, and a third axis, including at least four moveable sound-emitting members positioned and arranged for movement along the first and second axes, and a drive member positioned and arranged for movement along the first axis, wherein the movement along the first axis is transmitted into movement of at least one moveable sound-emitting member positioned on the first axis and of at least one moveable sound-emitting member positioned on the second axis, the device comprising:

a means for movement along the first axis to be transmitted into movement of the at least four moveable sound-emitting members;

a means for moving a substantially rigid push element along the first axis with a drive unit; and a means for moving, through a non-rigid connection having an adjustable modulus, the at least one moveable sound-emitting member positioned on the first axis in response to the movement of the substantially rigid push element along the first axis;

a means for moving the at least one moveable sound-emitting member positioned on the second axis in response to the movement of the substantially rigid push element along the first axis.

28. A device as in claim 27, further comprising a means for transmitting movement along the first axis to the at least four sound-emitting members through at least one non-rigid connection between a substantially rigid push element and at least one sound-emitting surface.

* * * * *